(12) United States Patent
Selvam

(10) Patent No.: US 12,555,101 B1
(45) Date of Patent: Feb. 17, 2026

(54) INTENT-AWARE DATA LEAK MITIGATION

(71) Applicant: U.S. Bank National Association, Minneapolis, MN (US)

(72) Inventor: Muthu Selvam, Huntersville, NC (US)

(73) Assignee: U.S. Bank National Association

( * ) Notice: Subject to any disclaimer, the term of this patent is extended or adjusted under 35 U.S.C. 154(b) by 0 days.

(21) Appl. No.: 19/276,513

(22) Filed: Jul. 22, 2025

(51) Int. Cl.
*G06Q 20/00* (2012.01)
*G06F 21/10* (2013.01)
*G06F 40/30* (2020.01)
*G06Q 20/38* (2012.01)

(52) U.S. Cl.
CPC ....... *G06Q 20/382* (2013.01); *G06F 21/1078* (2023.08); *G06F 40/30* (2020.01)

(58) Field of Classification Search
CPC .... G06Q 20/382; G06F 21/1078; G06F 40/30
USPC .......... 705/16, 21, 59; 380/44, 262
See application file for complete search history.

(56) References Cited

U.S. PATENT DOCUMENTS

2021/0209168 A1* 7/2021 Oswald .................. G06F 40/47

* cited by examiner

*Primary Examiner* — Dante Ravetti
(74) *Attorney, Agent, or Firm* — Garg Law Firm, PLLC; Rakesh Garg; Chris Ziolkowski

(57) ABSTRACT

A data flow is intercepted, the intercepted data including a set of data fields carrying a corresponding set of content. An intent is identified behind a transaction including the intercepted data. A conformity indication is set relative to a first data field in the set of data fields to indicate nonconformity of a first content of the first data field, the setting including comparing the first content with expected data corresponding to a mapping of the intent in a knowledge graph. Based on the conformity indication, the first content is modified to form modified content. In the transaction in the data flow, the first content is replaced with the modified content, the replacing forming a modified transaction. The modified transaction is transmitted to a receiver data processing system over a data integration channel.

20 Claims, 7 Drawing Sheets

INTENT-AWARE DATA LEAK MITIGATION

BACKGROUND

Financial institutions, including banks, credit unions, and investment firms, often require access to diverse sets of data from multiple sources to operate efficiently. Data integration is the process of combining and reconciling this disparate data into a unified view, enabling financial institutions to make informed decisions, improve customer experiences, and reduce risk. By integrating data between different financial institutions, organizations can gain a more comprehensive understanding of their customers' financial behaviors, preferences, and needs. This integrated data can be used to support various business functions, such as credit scoring, loan origination, account opening, and compliance monitoring.

The purposes of data integration between different financial institutions can be varied and multifaceted. Some common objectives behind collaborative data integration amongst financial institutions and other service providers include: (1) Improved Risk Management: By integrating data from multiple sources, financial institutions can better assess credit risk, detect potential fraud, and manage regulatory compliance. (2) Enhanced Customer Experience: Integrated data enables personalized marketing, targeted product offerings, and streamlined customer onboarding processes. (3) Increased Operational Efficiency: Data integration facilitates automation of manual processes, reduces errors, and enhances business intelligence capabilities. (4) Compliance with Regulatory Requirements: Financial institutions must comply with various regulations, such as Anti-Money Laundering (AML) and Know Your Customer (KYC). Integrated data helps ensure adherence to these regulations. (5) Innovative Product Development: By leveraging integrated data, financial institutions can create new products and services that cater to evolving customer needs.

Data integration also plays a role in facilitating secure, efficient, and reliable financial transactions between different financial institutions. For instance, when a customer initiates a transaction, such as a wire transfer or payment, the data flow between integrated data systems of different financial institutions can be used to verify the customer's identity, account balance, and transaction history. This enables the financial institution to approve or decline the transaction in real-time, while also ensuring compliance with relevant regulations. Additionally, data integration can help prevent fraudulent transactions by identifying suspicious patterns and anomalies in transaction behavior. Financial institutions can reduce the risk of errors, improve customer satisfaction, and increase the speed of transaction processing using data integration.

Intent detection is the process of identifying the underlying purpose or goal behind a user's input, such as text or speech. In recent years, machine learning (ML) has emerged as a powerful tool for intent detection, enabling computers to accurately understand and interpret human language. By training on vast amounts of labeled data, ML models can learn to recognize patterns and relationships between words, phrases, and context, allowing them to detect intents with high accuracy. For example, in a chatbot application, an ML model might be trained to detect intents such as "book a flight," "make a reservation," or "ask for directions." By accurately identifying the user's intent, the chatbot can provide relevant and helpful responses.

Several techniques and approaches are used in intent detection with ML, including supervised learning, deep learning, and natural language processing (NLP). Supervised learning involves training a model on labeled data, where each example is annotated with its corresponding intent. Deep learning models, such as recurrent neural networks (RNNs) and convolutional neural networks (CNNs), can learn complex patterns in text data and are often used for intent detection tasks. NLP techniques, such as named entity recognition (NER) and part-of-speech tagging, can also be used to improve the accuracy of intent detection models. Additionally, transfer learning and multitask learning approaches have been shown to be effective in intent detection tasks, allowing models to leverage pretrained knowledge and learn multiple intents simultaneously.

SUMMARY

The present disclosure includes inventive concepts relating generally to managing data leaks, such as methods, systems, and computer programs for intent-aware data leak mitigation. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a computer-implemented method of an embodiment intercepts a data flow to form intercepted data, which includes a set of data fields carrying a corresponding set of content. The embodiment identifies an intent behind a transaction that includes the intercepted data. The embodiment sets a conformity indication relative to a first data field in the set of data fields to indicate nonconformity of a first content of the first data field. The setting involves comparing the first content with expected data corresponding to a mapping of the intent in a knowledge graph. Based on the conformity indication, the embodiment modifies the first content to form modified content. The embodiment replaces the first content in the transaction in the data flow with the modified content, forming a modified transaction. The embodiment transmits the modified transaction to a receiver data processing system over a data integration channel.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

At least some novel features believed characteristic of examples of inventive concepts disclosed herein are set forth in the appended claims. The inventive concepts of the instant application, however, as well as a preferred mode of use, further objectives, and advantages thereof, will best be understood by reference to the following detailed description of the illustrative embodiments when read in conjunction with the accompanying drawings, wherein:

DETAILED DESCRIPTION

Figure 1:
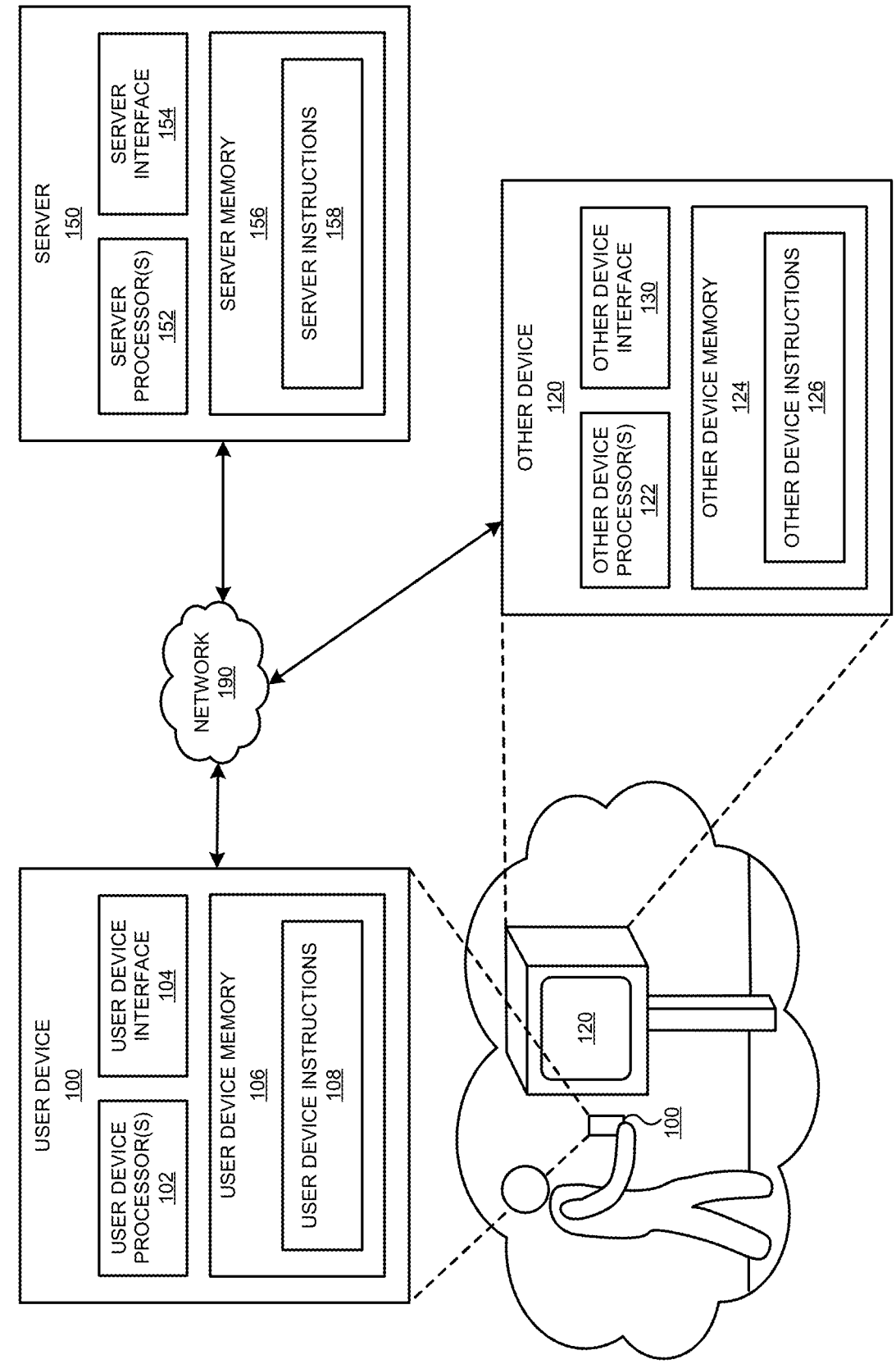
FIG. 1 depicts a block diagram of a computing environment in which an illustrative embodiment may be implemented.

A data leak refers to the unauthorized or unintentional disclosure of sensitive information, such as personal identifiable information (PII), financial data, intellectual property, or confidential business information, from an organization's systems, networks, or applications to external parties or environments. The illustrative embodiments recognize that many types of data-whether or not commonly recognized as sensitive data—can be the subject of unintentional, unauthorized, or undesirable disclosure, i.e., a data leak.

The illustrative embodiments recognize that a data leak can occur when data is shared with third-party services or application programming interfaces (APIs). Furthermore, if the data sharing or API connection is implemented without proper authorization, validation, or control, the data leak can potentially expose the data to unauthorized access, misuse, or exploitation. Financial institutions have data integrations, and form new integrations regularly with other financial institutions, vendors, service providers, and other third-parties in the normal course of their operation. The illustrative embodiments recognize that the current technology used for data leak prevention in third-party integrations in any data integration, and particularly in banking applications, has several limitations. The illustrative embodiments recognize that the presently used systems for data leak prevention rely on static rules and data type monitoring, which fail to understand the intent behind a data transaction. The illustrative embodiments recognize that this manner of implementing data leak prevention leads to over or under-permissive data sharing, exposure of sensitive or unnecessary information, failure to respond in a dynamically changing data leak in real-time transaction, and manual and error-prone rule setups that are not scalable or adaptive.

The illustrative embodiments recognize that these limitations of the presently available solutions result in ineffective data leak prevention, as traditional solutions are either unable to distinguish between necessary and unnecessary data sharing based on context and business rules, or only coarsely able to do so in the limited number of pre-programmed or predetermined circumstances. Furthermore, the illustrative embodiments recognize that the presently available solutions require manual intervention and rule updates, which can be time-consuming and prone to errors. Overall, the illustrative embodiments recognize that the current technology is inadequate for preventing data leakage during third-party integrations, highlighting the need for a more dynamic and intent-based approach. Within the context of the illustrative embodiments, "real-time" means as near in time as the occurrence of an event as is technologically possible; "dynamic" means changing from one instance, transaction, time or occurrence to another, often in conjunction with real-time transactions; "intent" of or behind a transaction means a purpose or objective to be accomplished with the transaction.

The illustrative embodiments provide an intent-aware data leakage prevention method and system that is designed for real-time monitoring and control of data exchanges in data integrations with third-parties. An embodiment uses natural language processing (NLP) and semantic validation to understand the purpose or intent of each data transaction in real-time and ensures that only the appropriate data is shared, dynamically blocking or modifying data that does not align with the intended business context. It should be noted that the same data can be appropriate in one context for one intent and inappropriate in another context for another intent-even when used in the same or similar type of transactions in the different contexts. For example, a complete identifier such as the driver license number of a person may be appropriate for verification when making the initial deposit transaction at the opening of an account, but may not be appropriate for verification when making a deposit transaction later into the same account.

An embodiment intercepts all outbound data flows from a financial institution application to a third-party system. The embodiment extracts the intent information related to a data flow using NLP and other suitable techniques. The embodiment uses the extracted intent to compare the actual data payload of the data flow against an expected data (data expected to be contained in the data flow) based on the intent.

An embodiment determines a real-time decision or outcome based on a level of semantic mismatch between the actual content and the expected content of the data flow on whether to allow as-is, block the data flow completely, or modify the data of that data flow. Based on the decision, an embodiment further generates a real-time audit trail, providing an explainable log of all decisions, which may be required for regulatory and other purposes.

To perform the semantic validation-determining the level of semantic mismatch between the actual content and the expected content of the data flow—an embodiment develops a dynamic knowledge graph by configuring the graph with mappings of valid relationships between intended data and third-party requirements. The embodiment maintains the valid relationships in the graph by adding, modifying, removing, or otherwise adjusting the mappings as may be necessary according to the real-time data flows and dynamically occurring patterns of data exposure and leaks. One embodiment further produces, such as by routing a semantic validation and the corresponding operation on the data flow to another model, a natural language text of a justification for each decision. The text can be useful for compliance with regulations like General Data Protection Regulation (GDPR) and Payment Card Industry Data Security Standard (PCI DSS).

The illustrative embodiments describe a method that evolves and learns from real-world interactions to refine its data-sharing rules, knowledge graph, and recognize dynamic data leaks in real-time, unlike the presently available static systems that require manual updates. The invention delivers a real-time, intent-aware artificial intelligence (AI) system that intelligently prevents, minimizes, or otherwise mitigates data leakage in data integrations, such as with third-party integrations in banking applications. By recognizing the intent behind a data exchange, the illustrative embodiments ensure that only contextually relevant data is shared. Leveraging NLP, semantic validation, and adaptive knowledge graphs, the system enhances security, regulatory compliance, and operational agility in dynamic digital ecosystems.

The illustrative embodiments address the risk of unintentional data leakage in third-party data integrations, with a specific embodiment configured to perform intent-aware data leak mitigation with respect to API integrations in banking applications. Traditional systems often fail to understand the intent behind a data transaction, leading to over-permissive data sharing, exposure of sensitive or unnecessary information, and manual and error-prone rule setups that are not scalable or adaptive. The proposed embodiments solve these and other related problems by providing a dynamic, intent-based approach to data leak prevention.

FIG. 1 depicts a block diagram of a computing environment in which an illustrative embodiment may be implemented. The computing environment, labeled and referred to as system 10, includes user device 100, other device 120, and server 170 connected to a network. System 10 is configured to load and execute at least some of the computer code involved in performing the inventive methods, such as server instructions 158, which include the server-side computer program instructions of an embodiment, user device instructions 108, which include the user device-side computer program instructions of an embodiment, and other device instructions 126, which include the other device-side computer program instructions of an embodiment, as may be needed to perform the dynamic adaptation of identity related user interface.

User device 100 is a device used by a user that can be used as part of processes described herein. User device 100 can include one or more aspects described elsewhere herein such as in reference to computing environment 600 of FIG. 6. In many examples, user device 100 is a personal computing device, such as a smart phone, tablet, laptop computer, or desktop computer. But device 100 need not be so limited and may instead encompass other devices used by a user as part of processes described herein. In the illustrated example, user device 100 can include one or more user device processors 102, one or more user device interfaces 104, and user device memory 106, among other components.

The one or more user device processors 102 are one or more components of user device 100 that execute instructions, such as instructions that obtain data, process the data, and provide output based on the processing. The one or more user device processors 102 can include one or more aspects described below in relation to the one or more processors 612 of FIG. 6.

The one or more user device interfaces 104 are one or more components of user device 100 that facilitate receiving input from and providing output to something external to user device 100. The one or more user device interfaces 104 can include one or more aspects described below in relation to the one or more interfaces 618 of FIG. 6.

User device memory 106 is a collection of one or more components of user device 100 configured to store instructions and data for later retrieval and use. User device memory 106 can include one or more aspects described below in relation to memory 614 of FIG. 6. As illustrated, user device memory 106 stores user device instructions 108 and other suitable user device code.

User device instructions 108 are a set of instructions that, when executed by one or more of the one or more user device processors 102, cause the one or more user device processors 102 to perform an operation described herein. In examples, instructions 108 can be those of a mobile application (e.g., that may be obtained from a mobile application store, such as the APPLE APP STORE or the GOOGLE PLAY STORE). The mobile application can provide a user interface for receiving user input from a user and acting in response thereto. User interface 104 can further provide output to the user. In some examples, client instructions 108 are instructions that cause a web browser of user device 100 to render a web page associated with a process described herein. The web page may present information to the user and be configured to receive input from the user and take actions in response thereto.

Other device 120 may be a self-service kiosk, a computer terminal, a dedicated transactions terminal-such as an electronic payment terminal, an automated customer interaction machine or device-such as an Automated Teller Machine (ATM), and the like.

In the illustrated example, other device 120 includes one or more other device processors 122, other device memory 124, and other device interface 130.

The one or more other device processors 122 are one or more components of other device 120 that execute instructions, such as instructions that obtain data, process the data, and provide output based on the processing. The one or more other device processors 122 can include one or more aspects described below in relation to the one or more processors 612 of FIG. 6.

Other device memory 124 is a collection of one or more components of other device 120 configured to store instructions and data for later retrieval and use. Other device memory 120 can include one or more aspects described below in relation to memory 614 of FIG. 6. Other device memory 120 can store other device instructions 126.

Other device instructions 126 are instructions that, when executed by the one or more processors 122, cause the one or more processors 122 to perform one or more operations described elsewhere herein.

The one or more other device interfaces 130 are one or more components of other device 120 that facilitate receiving input from and providing output to something external to other device 120. The one or more other device interfaces 130 can include one or more aspects described below in relation to the one or more interfaces 618 of FIG. 6.

Server 150 is a server device that functions as part of one or more processes described herein. In the illustrated example, server 150 includes one or more server processors 152, one or more server interfaces 154, and server memory 150, among other components.

The one or more server processors 152 are one or more components of server 150 that execute instructions, such as instructions that obtain data, process the data, and provide output based on the processing. The one or more server processors 152 can include one or more aspects described below in relation to the one or more processors 612 of FIG. 6.

The one or more server interfaces 154 are one or more components of server 150 that facilitate receiving input from and providing output to something external to server 150. The one or more server interfaces 154 can include one or more aspects described below in relation to the one or more interfaces 618 of FIG. 6.

Server memory 150 is a collection of one or more components of server 150 configured to store instructions and data for later retrieval and use. Server memory 150 can include one or more aspects described below in relation to memory 614 of FIG. 6. Server memory 150 can store server instructions 158.

Server instructions 158 are instructions that, when executed by the one or more processors 152, cause the one or more processors 152 to perform one or more operations described elsewhere herein.

Network 190 is a set of devices that facilitate communication from a sender to a destination, such as by implementing communication protocols. Example networks 190 include local area networks, wide area networks, intranets, and the Internet.

Figure 2:
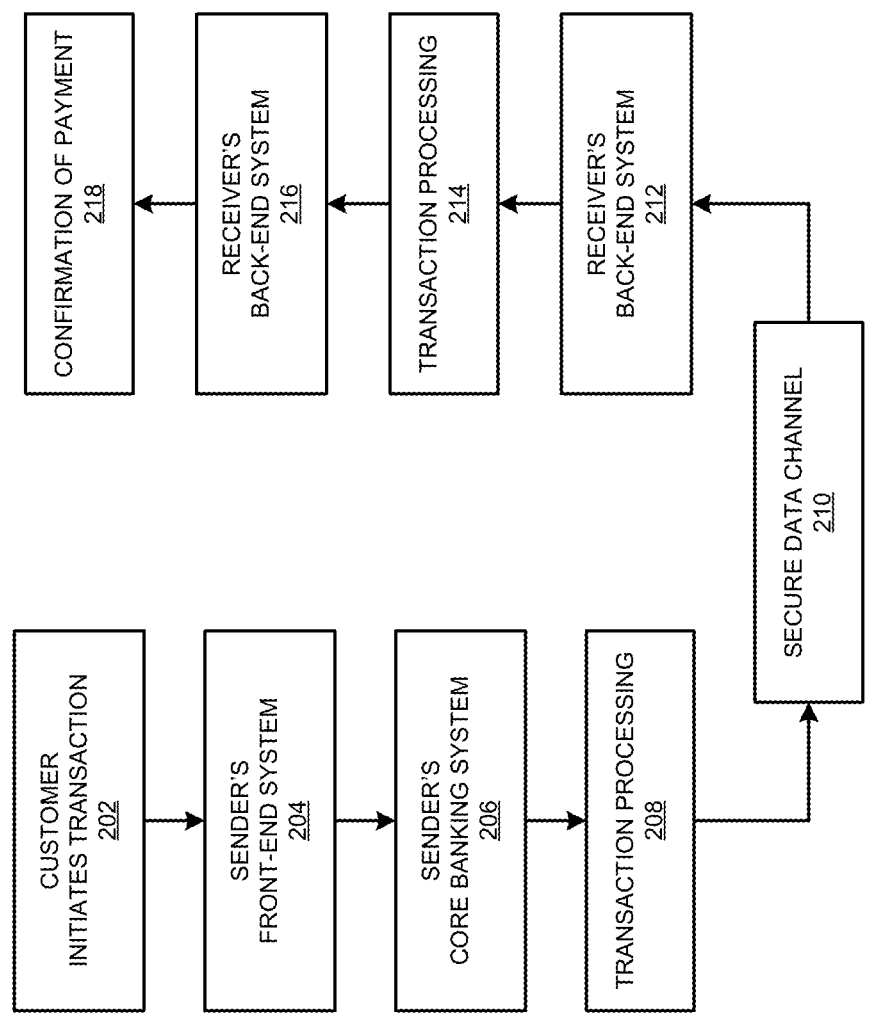
FIG. 2 depicts a typical transaction processing flow in accordance with an illustrative embodiment.

FIG. 2 depicts a typical transaction processing flow in accordance with an illustrative embodiment. Process 200 depicts a simplified example of an everyday financial transaction. Suppose that a user is making a payment using their financial institution's (sender's) app to a vendor who uses their financial institution's (receiver's) transaction processing services. A user device initiates transaction 202, which is then processed by sending entity's (sender's) front-end system 204. sender's front-end system 204 forwards the transaction to sender's core banking system 206. Sender's core banking system 206 processes the transaction and sends the transaction to transaction processing 208. Transaction processing 208 communicates uses secure data channel 210 to transmit the transaction data. Secure data channel 210 transmits the transaction data to a receiving entity's (receiver's) back-end system 212. Receiver's back-end system 212 processes the transaction and forwards it to transaction processing 214. Transaction processing 214 sends the transaction data to receiver's back-end system 216. Receiver's back-end system 216 confirms the payment through confirmation of payment 218.

This example shows that in performing this simple transaction, an integration between the sender's and the receiver's systems through the secure data channel can still be fraught with potential for data leaks. For example, the default integration may have been configured to always ask for KYC information such that the receiver receives the PII of the user with every transaction. As another example, the integration may have been configured such that the receiver receives the PII of the user with certain types of transaction, of which transaction 202 is one. As another example, something might happen during the transmission through channel 210, requiring the data of transaction 202 to be retransmitted but the retransmission is configured to capture a biometric aspect of the user, which the sender's policy does not permit. As can be seen, many scenarios can unfold even in such a simple transaction to cause data leaks to occur, data leak situations to change in real-time, or circumstances giving rise to data leak can arise in an unplanned manner.

An embodiment determines an intent associated with a transaction to which a data flow pertains. The decision process of an embodiment is dependent on the derived intent information. A transaction's data flow can include a variety of information that can be used by an embodiment to derive intent. For example, certain words or phrases in the transaction data can be indicative of a purpose, which can point to an intent ("pay for xyz" indicates a payment purpose—an intent to make a payment—suggesting that the transaction should only include an amount and an invoice or account number at a receiver but probably should not include the user's social security number). As another example, an certain history of transactions between the parties to a transaction can also be indicative of an intent (a payment data flow containing the user's social security number to a new receiver might be ok as the intent might be setting up a payment account with the receiver, but a payment data flow containing the user's social security number to an established receiver indicates an intent to make a regular payment suggesting that the transaction should include an amount and an invoice or account number at a receiver but probably should not include the user's social security number). As another example, a certain order or sequence of transactions in a session can also be indicative of an intent (a payment data flow containing a regular or established payment transaction followed by KYC transaction with the user's social security number may indicate a malicious intent to capture confidential information). As another example, certain numerical values, such as amounts and account numbers, can sometimes indicate an intent (a regular payment transaction that historically goes to account 1234 is now going to account 12345 and contains PII might indicate a malicious phishing intent).

These examples are not intended to be limiting on the illustrative embodiments. From this description, those of ordinary skill in the art will be able to derive intent from other configurations of data in a data flow from which to derive intent, and the same are contemplated with in the scope of the illustrative embodiments. A nonlimiting example implementation of an intent extraction process according to an embodiment uses NLP and involves (some or all of the) following steps—

1. Data Collection: Gather relevant data from various sources such as text, speech, images, videos, sensor readings, etc.
2. Data Preprocessing: Clean and preprocess the data by handling missing values, removing noise, and normalizing the data. Tokenize text data into individual words or phrases.
3. Feature Extraction: Identify relevant features that can help in intent extraction, such as keywords, sentiment analysis, named entities, etc. Use techniques like bag-of-words, TF-IDF, word embeddings (e.g., Word2Vec, GloVe), or topic modeling to extract features from text data.
4. Intent Identification: Use a machine learning algorithm and approach to identify potential intents behind the data. Some example techniques include supervised learning (e.g., classification), unsupervised learning (e.g., clustering), or reinforcement learning.
5. Intent Categorization: Group similar intents into categories or clusters based on their characteristics, such as topic, tone, or purpose.
6. Intent Refining: Analyze the categorized intents to refine them further by removing noise, resolving ambiguities, and identifying subtle nuances.
7. Contextual Understanding: Consider the context in which the data was generated, including user behavior, preferences, and external factors that might influence intent.
8. Validation and Feedback: Validate the extracted intents against human-annotated datasets or domain expertise to ensure accuracy and relevance. Use feedback from users, experts, or other automated sources, such as other models, to refine and improve the intent extraction process.

Some factors that affect the performance of intent extraction according to an embodiment include—

Domain knowledge: domain-specific knowledge informs feature engineering, model selection, and interpretation of results.

Cultural and linguistic nuances: cultural and linguistic differences may impact intent interpretation.

Generalizability: intent extraction method should generalize with acceptable outcomes across different contexts.

Figure 3:
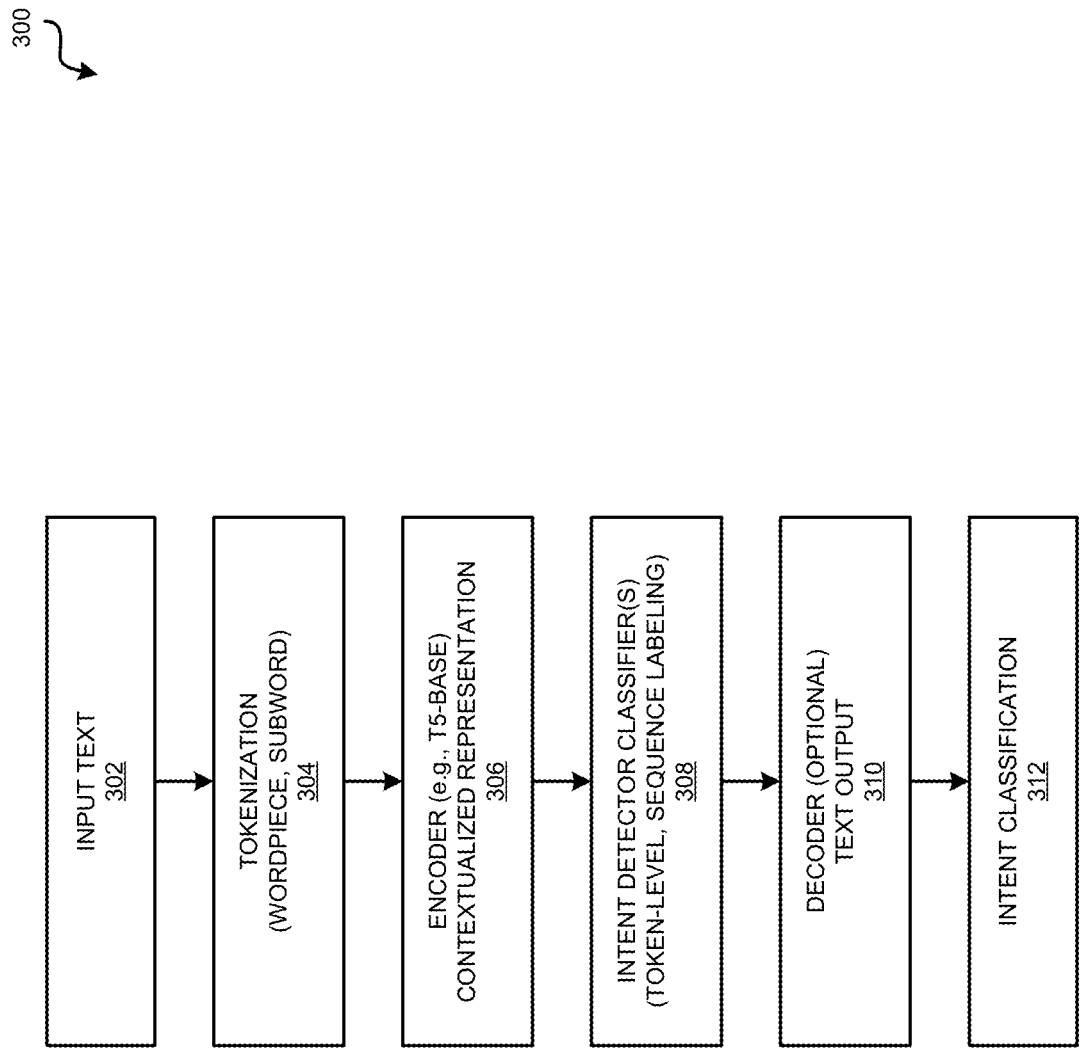
FIG. 3 depicts an example intent classification process using large or small language models in accordance with an illustrative embodiment.

FIG. 3 depicts an example intent classification process using large or small language models (SLM or LLM) in accordance with an illustrative embodiment. In process 300, input text 302 is a part of a transaction data flow that is isolated or extracted using a known method. Input text 302 is received and processed by tokenization process 304, which breaks down the text into wordpieces or subwords. Tokenization process 304 forwards the tokenized text to encoder 306, which generates contextualized representations using a trained model, such as T5-base. Encoder 306 sends the contextualized representations to intent detector classifier(s) 308, which perform token-level or sequence labeling to detect intent(s), e.g., in a manner described above. Intent detector classifier(s) 308 forward the detected intent(s) to decoder 310, which optionally generates a text output which could be descriptive of the intent, the context in which the architecture decided the intent's classification, and any other supporting text to describe or justify the intent determination. Decoder 310 outputs intent classification 312, which places the detected intent(s) into one or more classes or categories.

Figure 4:
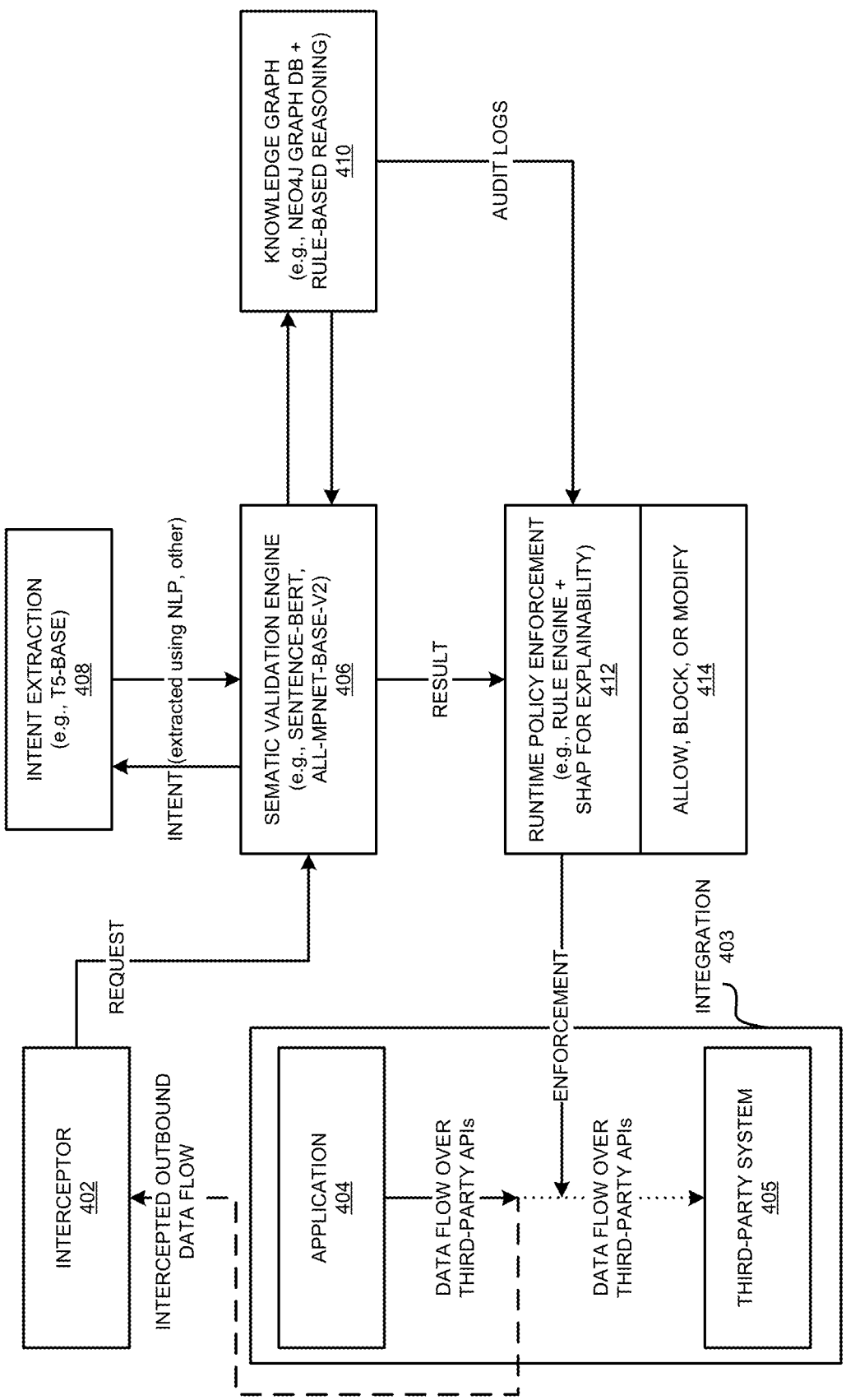
FIG. 4 depicts a configuration for intent-aware data leak mitigation in accordance with an illustrative embodiment.

FIG. 4 depicts a configuration for intent-aware data leak mitigation in accordance with an illustrative embodiment. Configuration 400 includes interceptor 402, which interacts with and/or monitors the data flow out of one or more applications, such as banking application 404 over APIs and other mechanisms of integration 403 with third-party systems 405.

Upon intercepting an outbound data flow, interceptor 402 sends a request with the intercepted data for intent-based validation to semantic validation engine 406. As an example, engine 406 can be implemented using, but not limited to, Sentence-BERT (all-mpnet-base-v2) for validation.

Semantic validation engine 406 sends the intercepted data to intent extraction component 408. Component 408 extracts one or more intents from the intercepted data in a manner described herein, and returns the intent(s) to semantic validation engine 406. Semantic validation engine 406 passes the intercepted data (or a processed form thereof), and the intent(s) obtained from intent extraction component 408, to knowledge graph component 410. Knowledge graph component 410 performs three functions—

(1) Using the intercepted data and the intent, search the knowledge graph do determine the valid type, form, pattern, value, or some combination of these and other aspects of the data (collectively and compactly referred to herein as expected data) that can be transmitted for that/those intent(s). Component 410 use the expected data to determine whether the actual content of the intercepted data conform to at least a threshold aspect of the expected data with at least a threshold degree of conformance.

(2) Using the intercepted data and the intent, modify the knowledge graph by (i) adding new graph mappings for what is henceforth regarded as expected data, (ii) delete an existing graph mapping to henceforth not regard some type, form, pattern, value, or some combination of these and other aspects of the data as expected data, (iii) change an existing graph mapping to henceforth regard a different type, form, pattern, value, or some combination of these and other aspects of the data as expected data. This operation keeps the knowledge graph current with respect to dynamic scenarios of intention-based data leaks unfolding in the integration data flows.

(3) Generate audit logs detailing the result of the conformity check between the various data fields of the intercepted data and the knowledge graph. The audit logs may also contain information about modifications carried out on the knowledge graph itself.

Component 410 returns to semantic validation engine 406 a result. The result includes an indication of conformity or nonconformity for the contents of all or some of the data fields in the intercepted data. In one embodiment, component 410 also returns a degree of conformity along with the indication for a data field. In one embodiment, a data field for which component 410 does not return an indication of conformity is regarded as conforming to expected data.

Semantic validation engine 406 may optionally apply further treatment to the result. For example, engine 406 may override a nonconformity indication of a data field and allow the content of the data field to pass. As another example, engine 406 may increase, decrease, or change a degree of conformity for a data field. Those of ordinary skill in the art will be able to conceive other treatments performable at engine 406 and the same are contemplated within the scope of the illustrative embodiments.

Engine 406, with or without modifying the result obtained from component 410, sends the result to enforcement engine 412. Enforcement engine 412 applies (operation 414) the result to the intercepted data by allowing the content a data field to pass, blocking the content of a data field to pass, or modifying the content of a data field before passing the content. Some non-limiting examples of the modifications that are performable as a part of applying (operation 414) include encrypting the content, masking or hiding in a suitable manner all or part of the content, obfuscating all or a part of the content. Those of ordinary skill in the art will be able to conceive other modifications as a part of operation 414, and the same are contemplated within the scope of the illustrative embodiments.

Enforcement engine 412 injects, inserts, or otherwise places the modified version of the intercepted data as a replacement for the intercepted data into the data flow over the API. Third-party system 405 receives the modified data resulting from the enforcement over integration 403 instead of the original data that application 404 transmitted, and which was intercepted by interceptor 402.

Figure 5:
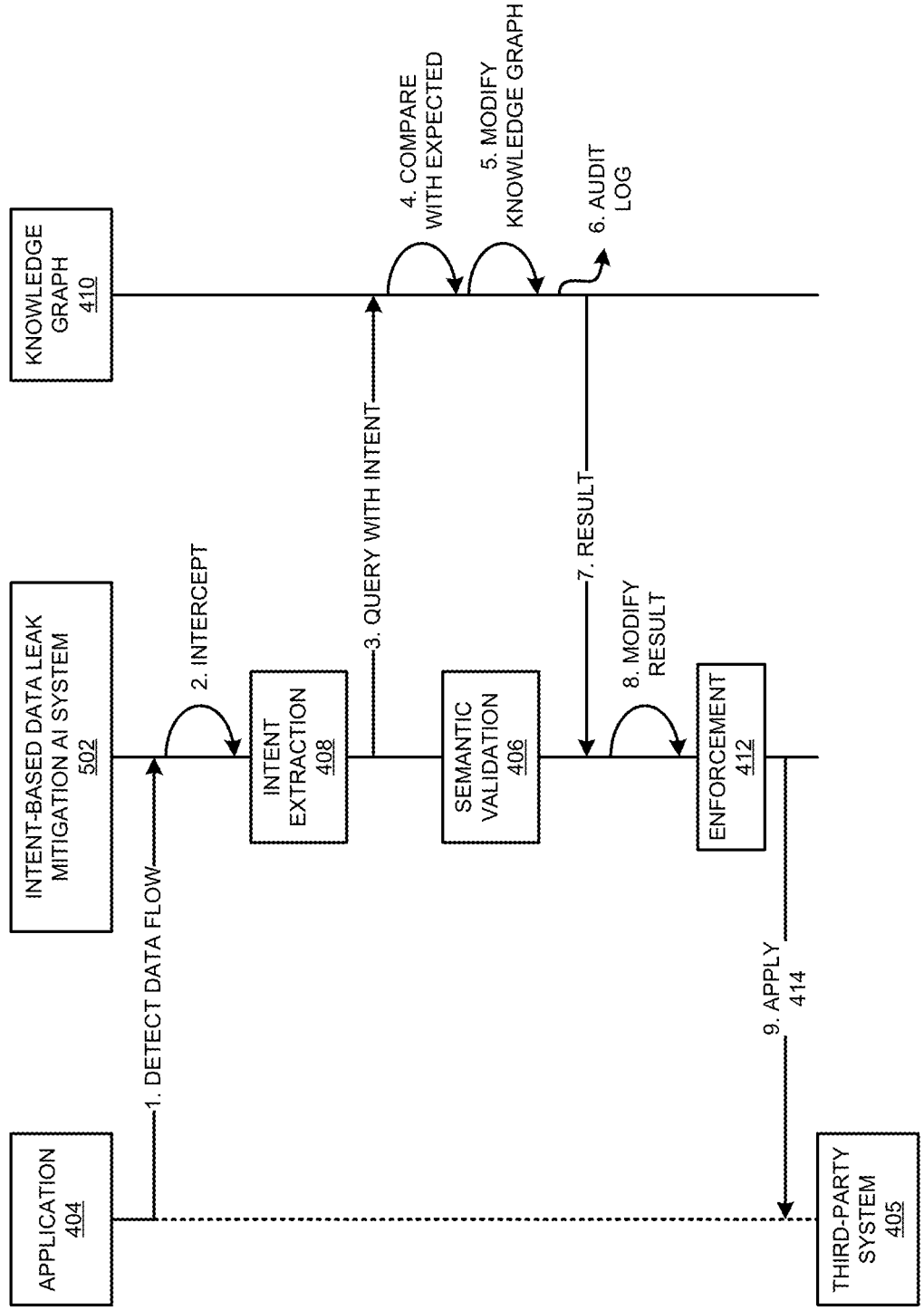
FIG. 5 depicts a timing diagram for intent-aware data leak mitigation in accordance with an illustrative embodiment.

FIG. 5 depicts a timing diagram for intent-aware data leak mitigation in accordance with an illustrative embodiment. Like numbered artifacts in diagram 500 and configuration 400 of FIG. 4 indicate the same component or functionality as described with respect to FIG. 4.

Application 404 originates a data flow. Intent-based data leak mitigation AI system 502 (which represents all or a part of configuration 400 of FIG. 4) detects (1) the data flow. System 502 intercepts (2) the data flow. Intent extraction component 408 extracts one or more intents. Semantic validation engine 406 queries (3) knowledge graph component 410 with the intercepted data and the extracted intent. Knowledge graph component 410 compares (4) the intercepted data with expected data. Knowledge graph component 410 modifies (5) the knowledge graph. Knowledge graph component 410 generates (6) audit logs. Knowledge graph component 410 returns (7) the result to semantic validation engine 406. Semantic validation engine 406 modifies (8) the result if needed and instructs enforcement engine 412. Enforcement engine 412 applies (9, 414) the instructions to the intercepted data and injects the modified data into the data flow directed at third-party system 405.

Figure 6:
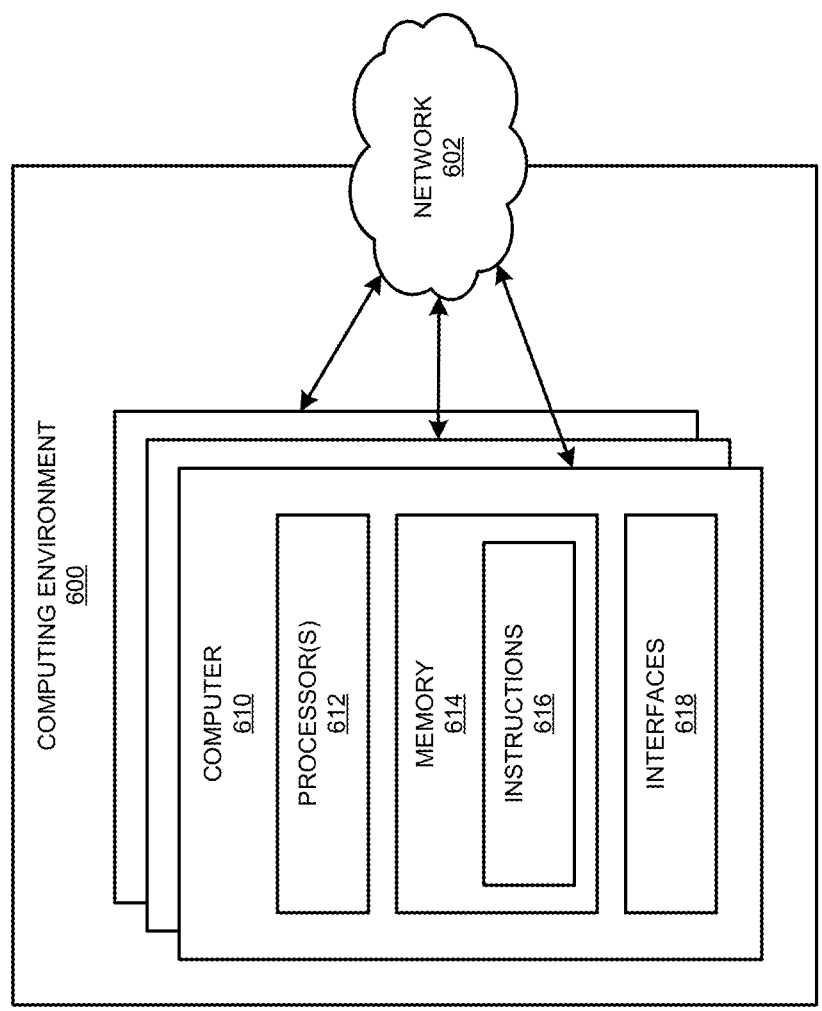
FIG. 6 depicts a data processing environment in which aspects of the present disclosure may be implemented.

FIG. 6 depicts a data processing environment 20 in which aspects of the present disclosure may be implemented. Computing environment 600 is a set of one or more virtual or physical computers 610 that individually or in cooperation achieve tasks, such as implementing one or more aspects described herein. Computers 610 have components that cooperate to cause output based on input. Example computers 610 include desktops, servers, mobile devices (e.g., smart phones and laptops), wearables, virtual reality devices, augmented reality devices, expanded reality devices, spatial computing devices, virtualized devices, other computers, or combinations thereof. In particular example implementations, computing environment 600 includes at least one physical computer.

Computing environment 600 may specifically be used to implement one or more aspects described herein. In some examples, one or more of computers 610 may be implemented as a user device, such as mobile device and others of computers 610 may be used to implement aspects of a machine learning framework useable to train and deploy models exposed to the mobile device or provide other functionality, such as through exposed application programming interfaces.

Computing environment 600 can be arranged in any of a variety of ways. Computers 610 can be local to or remote from other computers 610 of environment 600. Computing environment 600 can include computers 610 arranged according to client-server models, peer-to-peer models, edge computing models, other models, or combinations thereof.

In many examples, computers 610 are communicatively coupled with devices internal or external to computing environment 600 via network 602. Network 602 is a set of devices that facilitate communication from a sender to a destination, such as by implementing communication protocols. Example networks 602 include local area networks, wide area networks, intranets, or the Internet.

In some implementations, computers 610 can be general-purpose computing devices (e.g., consumer computing devices). In some instances, via hardware or software configuration, computers 610 can be special purpose computing devices, such as servers able to practically handle large amounts of client traffic, machine learning devices able to practically train machine learning models, data stores able to practically store and respond to requests for large amounts of data, other special purposes computers, or combinations thereof. The relative differences in capabilities of different kinds of computing devices can result in certain devices specializing in certain tasks. For instance, a machine learning model may be trained on a powerful computing device and then stored on a relatively lower powered device for use.

Many example computers 610 include one or more processors 612, memory 614, and one or more interfaces 618. Such components can be virtual, physical, or combinations thereof.

The one or more processors 612 are components that execute instructions, such as instructions that obtain data, process the data, and provide output based on the processing. The one or more processors 612 often obtain instructions and data stored in memory 614. The one or more processors 612 can take any of a variety of forms, such as central processing units, graphics processing units, coprocessors, tensor processing units, artificial intelligence accelerators, microcontrollers, microprocessors, application-specific integrated circuits, field programmable gate arrays, other processors, or combinations thereof. In example implementations, the one or more processors 612 include at least one physical processor implemented as an electrical circuit. Example providers of processors 612 include INTEL, AMD, QUALCOMM, TEXAS INSTRUMENTS, and APPLE.

Memory 614 is a collection of components configured to store instructions 616 and data for later retrieval and use. Instructions 616 can, when executed by the one or more processors 612, cause execution of one or more operations that implement aspects described herein. In many examples, memory 614 is a non-transitory computer readable medium, such as random-access memory, read only memory, cache memory, registers, portable memory (e.g., enclosed drives or optical disks), mass storage devices, hard drives, solid state drives, other kinds of memory, or combinations thereof. In certain circumstances, transitory memory 614 can store information encoded in transient signals.

The one or more interfaces 618 are components that facilitate receiving input from and providing output to something external to computer 610, such as visual output components (e.g., displays or lights), audio output components (e.g., speakers), haptic output components (e.g., vibratory components), visual input components (e.g., cameras), auditory input components (e.g., microphones), haptic input components (e.g., touch or vibration sensitive components), motion input components (e.g., mice, gesture controllers, finger trackers, eye trackers, or movement sensors), buttons (e.g., keyboards or mouse buttons), position sensors (e.g., terrestrial or satellite-based position sensors such as those using the Global Positioning System), other input components, or combinations thereof (e.g., a touch sensitive display). The one or more interfaces 618 can include components for sending or receiving data from other computing environments or electronic devices, such as one or more wired connections (e.g., Universal Serial Bus connections, THUNDERBOLT connections, ETHERNET connections, serial ports, or parallel ports) or wireless connections (e.g., via components configured to communicate via radiofrequency signals, such as according to WI-FI, cellular, BLUETOOTH, ZIGBEE, or other protocols). One or more of the one or more interfaces 618 can facilitate connection of computing environment 600 to network 690.

Computers 610 can include any of a variety of other components to facilitate performance of operations described herein. Example components include one or more power units (e.g., batteries, capacitors, power harvesters, or power supplies) that provide operational power, one or more busses to provide intra-device communication, one or more cases or housings to encase one or more components, other components, or combinations thereof.

A person of skill in the art, having benefit of this disclosure, may recognize various ways for implementing technology described herein, such as by using any of a variety of programming languages (e.g., a C-family programming language, PYTHON, JAVA, RUST, HASKELL, other languages, or combinations thereof), libraries or packages (e.g., that provide functions for obtaining, processing, and presenting data, such as may be obtained using a package manager like PIP or CONDA), compilers, and interpreters to implement aspects described herein. Example libraries include NLTK (Natural Language Toolkit) by Team NLTK (providing natural language functionality), PYTORCH by META (providing machine learning functionality), NUMPY by the NUMPY Developers (providing mathematical functions), and BOOST by the Boost Community (providing various data structures and functions) among others. Operating systems (e.g., WINDOWS, LINUX, MACOS, IOS, and ANDROID) may provide their own libraries or application programming interfaces useful for implementing aspects described herein, including user interfaces and interacting with hardware or software components. Web applications can also be used, such as those implemented using JAVASCRIPT or another language. A person of skill in the art, with the benefit of the disclosure herein, can use programming tools to assist in the creation of software or hardware to achieve techniques described herein, such as intelligent code completion tools (e.g., INTELLISENSE) and artificial intelligence tools (e.g., GITHUB COPILOT by MICROSOFT or CODE LLAMA by META).

In some examples, large language models can be used to understand natural language, generate natural language, or perform other tasks. Examples of such large language models include CHATGPT by OPENAI, a LLAMA model by META, a CLAUDE model by ANTHROPIC, others, or combinations thereof. Such models can be fine-tuned on relevant data using any of a variety of techniques to improve the accuracy and usefulness of the answers. The models can be run locally on server or client devices or accessed via an application programming interface. Some of those models or services provided by entities responsible for the models may include other features, such as speech-to-text features, text-to-speech, image analysis, research features, and other features, which may also be used as applicable.

Figure 7:
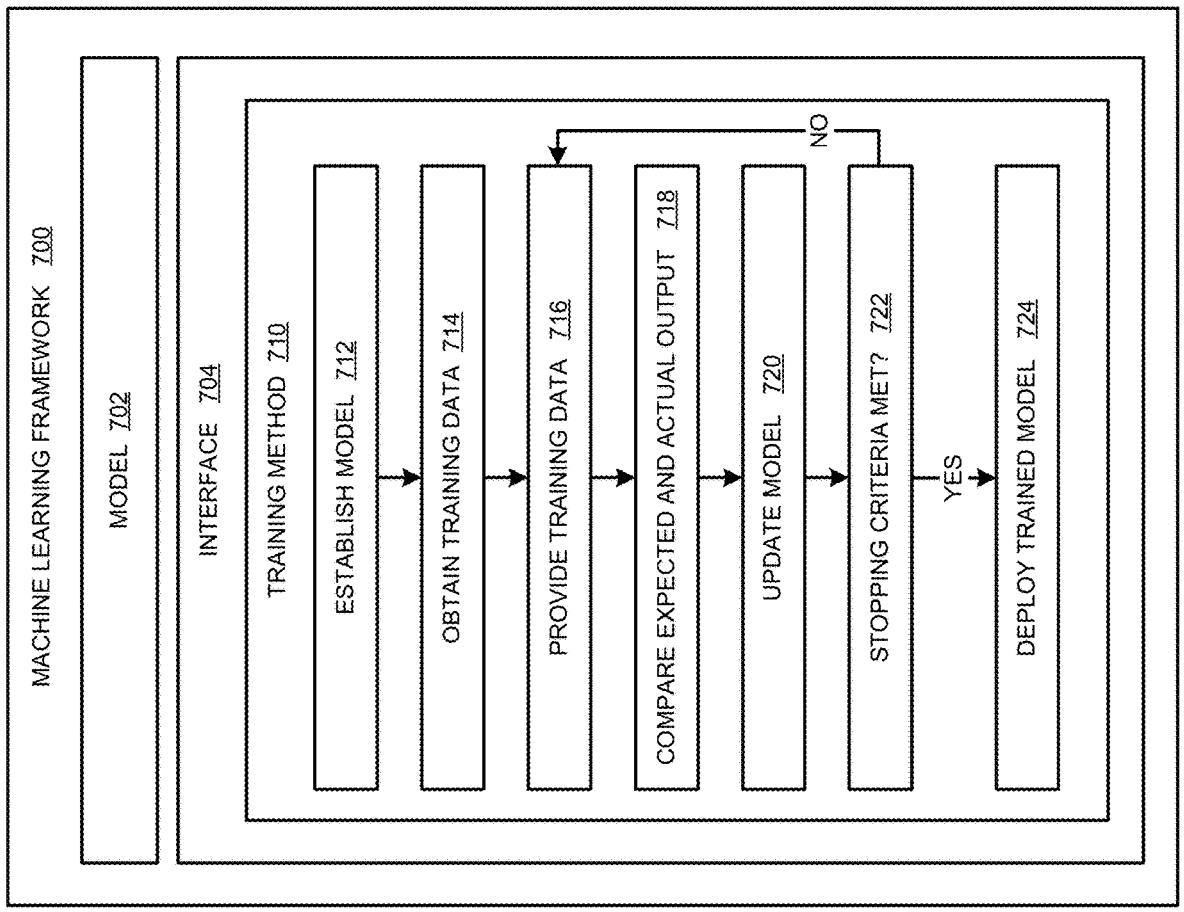
FIG. 7 depicts a configuration for machine learning in which aspects of the present disclosure may be implemented.

FIG. 7 illustrates an example machine learning framework 700 that techniques described herein may benefit from or improve on. A machine learning framework 700 is a collection of software and data that implements artificial intelligence trained to provide output, such as predictive data, based on input. Examples of artificial intelligence that can be implemented with machine learning way include neural networks (including recurrent neural networks), language models (including so-called "large language models"), generative models, natural language processing models, adversarial networks, decision trees, Markov models, support vector machines, genetic algorithms, others, or combinations thereof. A person of skill in the art having the benefit of this disclosure will understand that these artificial intelligence implementations need not be equivalent to each other and may instead select from among them based on the context in which they will be used. Machine learning frameworks 700 or components thereof are often built or refined from existing frameworks, such as TENSORFLOW by GOOGLE, INC. or PYTORCH by the PYTORCH community.

The machine learning framework 700 can include one or more models 702 that are the structured representation of learning and an interface 704 that supports use of the model 702.

The model 702 can take any of a variety of forms. In many examples, the model 702 includes representations of nodes (e.g., neural network nodes, decision tree nodes, Markov model nodes, other nodes, or combinations thereof) and connections between nodes (e.g., weighted or unweighted unidirectional or bidirectional connections). In certain implementations, the model 702 can include a representation of memory (e.g., providing long short-term memory functionality). Where the set includes more than one model 702, the models 702 can be linked, cooperate, or compete to provide output.

The interface 704 can include software procedures (e.g., defined in a library) that facilitate the use of the model 702, such as by providing a way to establish and interact with the model 702. For instance, the software procedures can include software for receiving input, preparing input for use (e.g., by performing vector embedding, such as using Word2Vec, BERT, or another technique), processing the input with the model 702, providing output, training the model 702, performing inference with the model 702, fine tuning the model 702, other procedures, or combinations thereof.

In an example implementation, interface 704 can be used to facilitate a training method 710 that can include operation 712. Operation 712 includes establishing a model 702, such as initializing a model 702. The establishing can include setting up the model 702 for further use (e.g., by training or fine tuning). The model 702 can be initialized with values. In examples, the model 702 can be pretrained. Operation 714 can follow operation 712. Operation 714 includes obtaining training data. In many examples, the training data includes pairs of input and desired output given the input. In supervised or semi-supervised training, the data can be prelabeled, such as by human or automated labelers. In unsupervised learning the training data can be unlabeled. The training data can include validation data used to validate the trained model 702. Operation 716 can follow operation 714. Operation 716 includes providing a portion of the training data to the model 702. This can include providing the training data in a format usable by the model 702. The framework 700 (e.g., via the interface 704) can cause the model 702 to produce an output based on the input. Operation 718 can follow operation 716. Operation 718 includes comparing the expected output with the actual output. In an example, this can include applying a loss function to determine the difference between expected and actual. This value can be used to determine how training is progressing. Operation 720 can follow operation 718. Operation 720 includes updating the model 702 based on the result of the comparison. This can take any of a variety of forms depending on the nature of the model 702. Where the model 702 includes weights, the weights can be modified to increase the likelihood that the model 702 will produce correct output given an input. Depending on the model 702, backpropagation or other techniques can be used to update the model 702. Operation 722 can follow operation 720. Operation 722 includes determining whether a stopping criterion has been reached, such as based on the output of the loss function (e.g., actual value or change in value over time). In addition or instead, whether the stopping criterion has been reached can be determined based on a number of training epochs that have occurred or an amount of training data that has been used. In some examples, satisfaction of the stopping criterion can include If the stopping criterion has not been satisfied, the flow of the method can return to operation 714. If the stopping criterion has been satisfied, the flow can move to operation 722. Operation 722 includes deploying the trained model 702 for use in production, such as providing the trained model 702 with real-world input data and produce output data used in a real-world process. The model 702 can be stored in memory 614 of at least one computer 610, or distributed across memories of two or more such computers 610 for production of output data (e.g., predictive data).

In addition to the depicted components of system 10 in FIG. 1, system 10 can also include many other components including, but not limited to—a public cloud, a private cloud, a gateway, a cloud orchestration module, a computer (which may further include specialized processing circuitry, cache, a communication fabric, a volatile memory, a persistent storage including an operating system, and peripheral devices), Internet of Things (IoT) sensors, a remote database, and a container set.

A device contemplated herein may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database. As is well understood in the art of computer technology, and depending upon the technology, performance of a computer-implemented method may be distributed among multiple computers and/or between multiple locations. Where the detailed discussion in this disclosure is focused on a single computer, such focus is only to keep the presentation as simple as possible. A computer or device contemplated herein may be located in or participate in a cloud, even though it is not shown in a cloud. On the other hand, a computer or device is not required to participate in a cloud except to any extent as may be affirmatively indicated.

A processor device described herein may be of any type now known or to be developed in the future, may be distributed over multiple packages or coordinated integrated circuit chips, and may implement multiple processor threads and/or multiple processor cores. Cache memory may be located in the processor chip package(s) and is typically used for data or code that should be available for rapid access by the threads or cores running on a processor. Cache memories are typically organized into multiple levels depending upon relative proximity to the processing circuitry. Alternatively, some, or all, of the cache for the processor set may be located "off chip." In some computing environments, a processor may be designed for working with qubits and performing quantum computing.

Computer readable program instructions are typically loaded onto a computing device to cause a series of operational steps to be performed by a processor set of the computing device and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache and the other storage media discussed below. The program instructions, and associated data, are accessed by the processor set to control and direct performance of the inventive methods. At least some of the instructions for performing the inventive methods may be stored in a persistent storage.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the embodiments. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment, either locally at a data processing system or over a data network, within the scope of the illustrative embodiments. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment within the scope of the illustrative embodiments. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments each have been described by stating their individual advantages, respectively, present application is not limited to a particular combination thereof. To the contrary, such embodiments may also be combined in any way and number according to the intended deployment of present embodiments without losing their beneficial effects.

Techniques herein may be applicable to improving technological processes of a financial institution, such as technological aspects of transactions (e.g., resisting fraud, entering loan agreements, transferring financial instruments, or facilitating payments). Although technology may be related to processes performed by a financial institution, unless otherwise explicitly stated, claimed inventions are not directed to fundamental economic principles, fundamental economic practices, commercial interactions, legal interactions, or other patent ineligible subject matter without something significantly more.

Where implementations involve personal or corporate data, that data can be stored in a manner consistent with relevant laws and with a defined privacy policy. In certain circumstances, the data can be decentralized, anonymized, or fuzzed to reduce the amount of accurate private data that is stored or accessible at a particular computer. The data can be stored in accordance with a classification system that reflects the level of sensitivity of the data and that encourages human or computer handlers to treat the data with a commensurate level of care.

Where implementations involve machine learning, machine learning can be used according to a defined machine learning policy. The policy can encourage training of a machine learning model with a diverse set of training data. Further, the policy can encourage testing for and correcting undesirable bias embodied in the machine learning model. The machine learning model can further be aligned such that the machine learning model tends to produce output consistent with a predetermined morality. Where machine learning models are used in relation to a process that makes decisions affecting individuals, the machine learning model can be configured to be explainable such that the reasons behind the decision can be known or determinable. The machine learning model can be trained or configured to avoid making decisions based on protected characteristics.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method, comprising:
   intercepting a data flow to form intercepted data, the intercepted data comprising a set of data fields carrying a corresponding set of content;
   identifying an intent behind a transaction comprising the intercepted data;
   setting a conformity indication relative to a first data field in the set of data fields to indicate nonconformity of a first content of the first data field, the setting comprising comparing the first content with an expected data corresponding to a mapping of the intent in a knowledge graph;
   modifying, based on the conformity indication, the first content to form a modified content;
   replacing in the transaction in the data flow, the first content with the modified content, the replacing forming a modified transaction; and
   transmitting the modified transaction to a receiver data processing system over a data integration channel.

2. The computer-implemented method of claim 1, further comprising:
   monitoring the data integration channel, wherein the data flow occurs in the data integration channel over an application programming interface (API).

3. The computer-implemented method of claim 1, wherein the identifying the intent comprises:
   extracting, using natural language processing (NLP), intent information from a natural language content in a second data field from the set of data fields of the intercepted data.

4. The computer-implemented method of claim 1, wherein the identifying the intent comprises:
   deducing intent information from an ordering of transactions in a set of transactions in the data flow, the transaction being a member of the set of transactions.

5. The computer-implemented method of claim 1, wherein the identifying the intent comprises:
   deducing intent information using a history of transactions associated with an account identifier in the transaction in the data flow, the transaction being a member of the set of transactions.

6. The computer-implemented method of claim 1, wherein the identifying the intent comprises:
   deducing intent information from a numerical content of a second data field from the set of data fields of the intercepted data, wherein the numerical content deviates relative to a value by greater than a threshold degree, the value being associated with an account identifier in the transaction in the data flow.

7. The computer-implemented method of claim 1, wherein an aspect of the expected data comprises at least one of a type, a form, a pattern, and a value of valid data.

8. The computer-implemented method of claim 1, further comprising:
   setting a degree of conformity indication relative to the first data field.

9. The computer-implemented method of claim 1, further comprising:
   modifying the mapping in the knowledge graph using the intent and the first content.

10. The computer-implemented method of claim 9, wherein the modifying the mapping comprises:
    setting an aspect of the expected data to match a corresponding aspect of the first content, the changing forming new expected data, and wherein the first content is nonconforming with the expected data and wherein the first content becomes conforming with the new expected data.

11. The computer-implemented method of claim 9, wherein the modifying the mapping comprises:
    constructing a new mapping in the knowledge graph using the intent and new expected data such that the first content is identified as nonconforming with the new expected data due to the intent.

12. The computer-implemented method of claim 1, wherein the modifying comprises encrypting the first content.

13. The computer-implemented method of claim 1, wherein the modifying comprises masking at least a portion of the first content.

14. The computer-implemented method of claim 1, wherein the modifying comprises obfuscating at least a portion of the first content.

15. The computer-implemented method of claim 1, wherein the modifying comprises rendering the first content unavailable to a receiver of the data flow.

16. A computer program product comprising one or more computer readable storage media, and program instructions collectively stored on the one or more computer readable storage media, the program instructions executable by a set of one or more processors to cause the set of one or more processors to perform operations comprising:
   intercepting a data flow to form intercepted data, the intercepted data comprising a set of data fields carrying a corresponding set of content;
   identifying an intent behind a transaction comprising the intercepted data;
   setting a conformity indication relative to a first data field in the set of data fields to indicate nonconformity of a first content of the first data field, the setting comprising comparing the first content with an expected data corresponding to a mapping of the intent in a knowledge graph;
   modifying, based on the conformity indication, the first content to form a modified content;
   replacing in the transaction in the data flow, the first content with the modified content, the replacing forming a modified transaction; and
   transmitting the modified transaction to a receiver data processing system over a data integration channel.

17. The computer program product of claim 16, the operations further comprising:
   monitoring the data integration channel, wherein the data flow occurs in the data integration channel over an application programming interface (API).

18. The computer program product of claim 17, wherein the stored program instructions are stored in a computer readable storage device in a data processing system, and wherein the stored program instructions are transferred over a network from a remote data processing system.

19. The computer program product of claim 17, wherein the stored program instructions are stored in a computer readable storage device in a server data processing system, and wherein the stored program instructions are downloaded in response to a request over a network to a remote data processing system for use in a computer readable storage device associated with the remote data processing system, the operations further comprising:
   metering a use of the program instructions associated with the request; and
   generating an invoice based on the use.

20. A computer system comprising a set of one or more processors and one or more computer readable storage media, and program instructions collectively stored on the one or more computer readable storage media, the program instructions executable by the set of one or more processors to cause the processor to perform operations comprising:
   intercepting a data flow to form intercepted data, the intercepted data comprising a set of data fields carrying a corresponding set of content;
   identifying an intent behind a transaction comprising the intercepted data;
   setting a conformity indication relative to a first data field in the set of data fields to indicate nonconformity of a first content of the first data field, the setting comprising comparing the first content with an expected data corresponding to a mapping of the intent in a knowledge graph;
   modifying, based on the conformity indication, the first content to form a modified content;
   replacing in the transaction in the data flow, the first content with the modified content, the replacing forming a modified transaction; and
   transmitting the modified transaction to a receiver data processing system over a data integration channel.

* * * * *